US012287826B1

(12) United States Patent
Newman et al.

(10) Patent No.: US 12,287,826 B1
(45) Date of Patent: Apr. 29, 2025

(54) SYSTEMS AND METHODS FOR SHARING MEDIA ITEMS CAPTURING SUBJECTS

(71) Applicant: GoPro, Inc., San Mateo, CA (US)

(72) Inventors: David Newman, San Diego, CA (US); Timothy David Bucklin, San Diego, CA (US); Otto Sievert, Oceanside, CA (US); Luc Sargent, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 503 days.

(21) Appl. No.: 17/853,689

(22) Filed: Jun. 29, 2022

(51) Int. Cl.
*G06F 16/58* (2019.01)
*G06F 16/78* (2019.01)

(52) U.S. Cl.
CPC .............. *G06F 16/58* (2019.01); *G06F 16/78* (2019.01)

(58) Field of Classification Search
CPC ...................................................... G06F 16/58
See application file for complete search history.

(56) References Cited

U.S. PATENT DOCUMENTS

| | | |
|---|---|---|
| 5,130,794 A | 7/1992 | Ritchey |
| 6,337,683 B1 | 1/2002 | Gilbert |
| 6,593,956 B1 | 7/2003 | Potts |
| 7,222,356 B1 | 5/2007 | Yonezawa |
| 7,483,618 B1 | 1/2009 | Edwards |
| 8,446,433 B1 | 5/2013 | Mallet |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |

(Continued)

FOREIGN PATENT DOCUMENTS

| | | |
|---|---|---|
| WO | 2001020466 | 3/2001 |
| WO | 2009040538 A1 | 4/2009 |

OTHER PUBLICATIONS

Ernoult, Emeric, 'How to Triple Your YouTube Video Views with Facebook', SocialMediaExaminer.com, Nov. 26, 2012, 16 pages.

(Continued)

*Primary Examiner* — Simon P Kanaan
(74) *Attorney, Agent, or Firm* — Esplin & Associates, PC

(57) ABSTRACT

Media items (e.g., images, videos) may be captured by one or more image capture devices. One or more of the media items may be identified as including/likely including depiction of a user based on proximity of capture of the media item(s) in time and location to the user. The identified media item(s) may be provided to the user.

18 Claims, 7 Drawing Sheets

(56) References Cited

U.S. PATENT DOCUMENTS

| | | |
|---|---|---|
| 9,564,173 B2 | 2/2017 | Swenson |
| 9,652,667 B2 | 5/2017 | Macmillan |
| 9,754,159 B2 | 9/2017 | Macmillan |
| 9,760,768 B2 | 9/2017 | Macmillan |
| 10,084,961 B2 | 9/2018 | Macmillan |
| 2004/0062439 A1 | 4/2004 | Cahill |
| 2004/0128317 A1 | 7/2004 | Sull |
| 2004/0169724 A1 | 9/2004 | Ekpar |
| 2005/0025454 A1 | 2/2005 | Nakamura |
| 2006/0122842 A1 | 6/2006 | Herberger |
| 2007/0173296 A1 | 7/2007 | Hara |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253735 A1 | 10/2008 | Kuspa |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | Mccutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0233000 A1* | 9/2012 | Fisher ............ G06F 16/58 705/14.71 |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | Mcintosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0012827 A1 | 1/2015 | Elmeih |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0154782 A1 | 6/2015 | Geisner |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0358603 A1 | 12/2016 | Azam |
| 2016/0366330 A1 | 12/2016 | Boliek |
| 2017/0006214 A1 | 1/2017 | Andreassen |
| 2017/0110155 A1 | 4/2017 | Campbell |
| 2017/0295318 A1 | 10/2017 | Macmillan |

(56) References Cited

U.S. PATENT DOCUMENTS

2017/0366755 A1 12/2017 Lustig
2018/0103197 A1 4/2018 Campbell

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>. 24 pages.
FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>. 15 pages.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structAVPacket.html>. 9 pages.
Han et al., 'Deep Compression: Compressing Deep Neural Networks with Pruning', Trained Quantization and Huffman Coding, International Conference on Learning Representations, 2016, 14 pgs.
He et al., 'Deep Residual Learning for Image Recognition,' arXiv:1512.03385, 2015, 12 pgs.
Iandola et al., 'SqueezeNet: AlexNet-level accuracy with 50x fewer parameters and <0.5MB model size', arXiv:1602.07360v3 [cs.CV] Apr. 6, 2016 (9 pgs.).
Parkhi et al., 'Deep Face Recognition,' Proceedings of the British Machine Vision, 2015, 12 pgs.
PCT International Preliminary Report on Patentability for PCT/US2015/023680, dated Oct. 4, 2016, 10 pages.
PCT International Search Reort for PCT/US15/18538 dated Jun. 16, 2015 (2 pages).
PCT International Search Report and Written Opinion for PCT/US15/12086 dated Mar. 17, 2016, 7 pages.
PCT International Search Report and Written Opinion for PCT/US15/18538, Jun. 16, 2015, 26 pages.
PCT International Search Report and Written Opinion for PCT/US16/31076, Aug. 8, 2016, 19 Pages.
PCT International Search Report for PCT/US15/23680 dated Aug. 3, 2015, 4 pages.
PCT International Search Report for PCT/US15/41624 dated Nov. 4, 2015, 5 pages.
PCT International Search Report for PCT/US17/16367 dated Apr. 14, 2017 (2 pages).
PCT International Written Opinion for PCT/US2015/041624, Dec. 17, 2015, 7 Pages.
Ricker, 'First Click: TomTom's Bandit camera beats GoPro with software', Mar. 9, 2016 URL: http://www.theverge.com/2016/3/9/11179298/tomtom-bandit-beats-gopro (6 pages).
Schroff et al., 'FaceNet: A Unified Embedding for Face Recognition and Clustering,' IEEE Conference on Computer Vision and Pattern Recognition (CVPR), 2016, 10 pgs.
Sergey Ioffe and Christian Szegedy, "Batch Normalization: Accelerating Deep Network Training by Reducing Internal Covariate Shift," in Proc. ICML. 2015, pp. 448-456, JMLR.org.
Tran et al., 'Learning Spatiotemporal Features with 3D Convolutional Networks', arXiv:1412.0767 [cs.CV] Dec. 2, 2014 (9 pgs).
Yang et al., 'Unsupervised Extraction of Video Highlights Via Robust Recurrent Auto-encoders' arXiv:1510.01442v1 [cs.CV] Oct. 6, 2015 (9 pgs).

\* cited by examiner

SYSTEMS AND METHODS FOR SHARING MEDIA ITEMS CAPTURING SUBJECTS

FIELD

This disclosure relates to identifying media items for sharing based on proximity of capture locations to locations of users.

BACKGROUND

Image capture devices may be used to capture media items (e.g., images, videos) at different locations and different times. People may be interested in media items in which they are depicted. Manually identifying and sharing media items that include depiction of a specific person may be difficult and time consuming.

SUMMARY

This disclosure relates to identifying media items that depict subjects for sharing. Capture information of a set of media items, user information, and/or other information may be obtained. The capture information may define capture locations and capture times of the set of media items. The user information may define one or more locations of a user at one or more times. One or more media items may be identified from the set of media items based on the capture information of the set of media items, the user information, and/or other information. A given media item captured by a given image capture device may be identified based on proximity of capture of the given media item in time and location to the user and/or other information. The identified media item(s) may be provided to the user.

A system for identifying media items may include one or more electronic storage, processor, and/or other components. The electronic storage may store capture information, information relating capture of media items, user information, information relating to a user, information relating to identification of media items, information relating to provision of media items to the user, and/or other information.

The processor(s) may be configured by machine-readable instructions. Executing the machine-readable instructions may cause the processor(s) to facilitate identifying media items. The machine-readable instructions may include one or more computer program components. The computer program components may include one or more of a capture information component, a user information component, an identification component, a provision component, and/or other computer program components.

The capture information component may be configured to obtain capture information of a set of media items and/or other information. The capture information may define capture locations and capture times of the set of media items.

The user information component may be configured to obtain user information and/or other information. The user information may define one or more locations of a user at one or more times.

The identification component may be configured to identify one or more media items from the set of media items. The media item(s) may be identified based on the capture information of the set of media items, the user information, and/or other information. A given media item captured by a given image capture device may be identified based on proximity of capture of the given media item in time and location to the user and/or other information.

In some implementations, the given media item being identified based on the proximity of the capture of the given media item in time and location to the user may include the given media item being identified based on a first capture location of the given media item at a first capture time being within a threshold distance of a first location of the user at the first capture time. In some implementations, the given media item may be identified further based on determination that the user is within a field of view of the given image capture device during capture of the given media item.

In some implementations, a size of the field of view of the given image capture device may be determined based on a size of punchout used by the given image capture device to capture the given media item and/or other information.

In some implementations, a direction in which the field of view of the given image capture device is pointed may be determined based on motion of the given image capture device and/or other information. In some implementations, the direction determined based on the motion of the given image capture device may be confirmed using motion vector of the given media item.

In some implementations, the given media item may be identified further based on a size of the user depicted within the given media item.

The provision component may be configured to provide the identified media item(s) to the user. Providing an identified media item to the user may include presenting, sending, making available, and/or otherwise providing the identified media item to the user.

In some implementations, permission to provide the given media item to the user may be obtained before capture of the given media item. In some implementations, the permission to provide the given media item to the user may be obtained via scanning of a machine-readable optical code by the given image capture device that captured the given media item.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
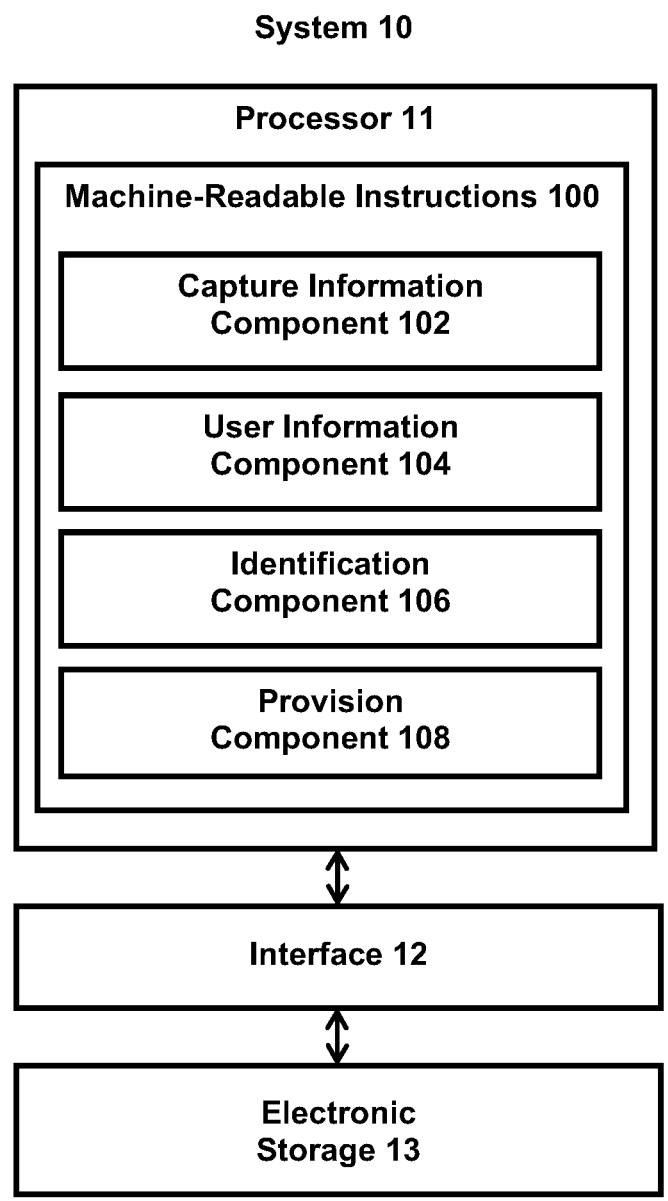
FIG. 1 illustrates an example system for identifying media items.

FIG. 1 illustrates a system 10 for identifying media items that depict subjects for sharing. The system 10 may include one or more of a processor 11, an interface 12 (e.g., bus, wireless interface), an electronic storage 13, and/or other components. Capture information of a set of media items, user information, and/or other information may be obtained by the processor 11. The capture information may define capture locations and capture times of the set of media items. The user information may define one or more locations of a user at one or more times. One or more media items may be identified from the set of media items by the processor 11 based on the capture information of the set of media items, the user information, and/or other information. A given media item captured by a given image capture device may be identified by the processor 11 based on proximity of capture of the given media item in time and location to the user and/or other information. The identified media item(s) may be provided by the processor 11 to the user.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store capture information, information relating capture of media items, user information, information relating to a user, information relating to identification of media items, information relating to provision of media items to the user, and/or other information.

The system 10 may be remote from an image capture device or local to the image capture device. One or more portions of the image capture device may be remote from or be a part of the system 10. One or more portions of the system 10 may be remote from or be a part of the image capture device. For example, one or more components of the system 10 may be carried by a housing, such as a housing of an image capture device. As another example, one or more components of the system 10 may be part of a computing device separate from the image capture device, such as a mobile device (e.g., smartphone, tablet, laptop), a desktop device (e.g., desktop computer), or a server.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate identifying media items. The machine-readable instructions 100 may include one or more computer program components. The machine-readable instructions 100 may include one or more of a capture information component 102, a user information component 104, an identification component 106, a provision component 108, and/or other computer program components.

The capture information component 102 may be configured to obtain capture information of a set of media items and/or other information. Obtaining capture information may include one or more of accessing, acquiring, analyzing, capturing, determining, examining, generating, identifying, loading, locating, opening, receiving, retrieving, reviewing, selecting, storing, and/or otherwise obtaining the capture information. The capture information component 102 may obtain capture information from one or more locations. For example, the capture information component 102 may obtain capture information from a storage location, such as the electronic storage 13, electronic storage of information and/or signals generated by one or more sensors, electronic storage of a device accessible via a network, and/or other locations. The capture information component 102 may obtain capture information from one or more hardware components (e.g., an image capture device, a network device, a storage device) and/or one or more software components (e.g., software running on a computing device).

In some implementations, the capture information may be obtained from the set of media items. For example, the capture information may be part of the set of media items. For instance, the capture information may be stored within a metadata track of a media item file (e.g., video file, image file), and the capture information may be identified/extracted from the metadata track of the media item file. The capture information may be obtained before, at the same time as, and/or after media information defining media items is obtained.

Media items may refer to items that may be visually and/or audibly consumed. Media items may refer to multi-media items. For example, media items may include images, videos, sound clips, and/or other media items. Media items may be captured by one or more image capture devices. An image capture device may capture visual content in form of images, videos, and/or other forms. An image capture device may include one or more optical elements, one or more image sensors, one or more sound sensors, and/or other components. The optical element(s) (e.g., lens) may guide light within a field of view to the image sensor(s). The image sensor(s) may convert the received light into output signals that convey information defining visual content of image(s). The sound sensor(s) may receive and convert sound into output signals that convey information defining audio content of sound clip(s). An image capture device may be a standalone device (e.g., camera, image sensor, microphone) or may be part of another device (e.g., part of a smartphone, tablet). In some implementations, an image capture device may capture 360 degree/spherical images and/or videos. Other types of image capture devices are contemplated.

An image capture device may include one or more Global Positioning System (GPS) sensors (e.g., GPS receiver(s)). The GPS sensor(s) may be used to determine time and/or location at which media items are captured by the image capture device. For example, the GPS sensor(s) may provide information on when and/or where images/videos are captured by the image capture device. The GPS sensor(s) may provide information on the motion of the image capture device during capture of the media items.

A set of media items may include multiple media items. A set of media items may include a group of media items. A set of media items may include one or more images, one or more videos, and/or other media items. Individual media items may be stored in a single file or in multiple files. Multiple media items may be stored in a single file or in multiple files.

In some implementations, media item(s) may be included within a set of media items manually (e.g., manual selection of media items by a user for inclusion within a set) and/or automatically (e.g., automatic selection of media items by software/algorithm for inclusion within a set). For example, a set of media items may include media items based on permission to share the media items, when the media items were captured, where the media items were captured, what the media items captured, the image capture device used to capture the media items, user associated with the image capture device used to capture the media items, and/or other factors.

The capture information may define capture locations and capture times of the set of media items. A capture location of a media item may refer to a location from which the media item was captured by an image capture device. The value(s) of the capture location of a media item may specify where (e.g., address, place, longitude and latitude) the media item was captured by the image capture device. In some implementations, a capture location of a media item may include a GPS location of the image capture device during capture of the media item. A GPS location may refer to a location of the image capture device determined using the Global Positioning System. In some implementations, the location of the image capture device may not change. That is, the image capture device may be a stationary image capture device.

A capture time of a media item may refer to a time when the media item was captured by the image capture device. The value(s) of the capture time of a media item may specify when (e.g., date, hour, minute, second) the media item was captured by the image capture device. In some implementations, a capture time of a media item may include a GPS time of the image capture device during capture of the media item. A GPS time may refer to a time of the image capture device determined using the Global Positioning System.

The capture information may define capture locations and capture times of the set of media items by including information that defines one or more content, qualities, attributes, features, and/or other aspects of the capture locations and the capture times of the set of media items. For example, the capture information may define capture locations and capture times of the set of media items by including information that makes up/specifies the capture locations and the capture times of the set of media items and/or information that is used to determine the capture location and the capture times of the set of media items. Other types of capture information are contemplated.

The user information component 104 may be configured to obtain user information and/or other information. Obtaining user information may include one or more of accessing, acquiring, analyzing, capturing, determining, examining, generating, identifying, loading, locating, opening, receiving, retrieving, reviewing, selecting, storing, and/or otherwise obtaining the user information. The user information component 104 may obtain user information from one or more locations. For example, the user information component 104 may obtain user information from a storage location, such as the electronic storage 13, electronic storage of information and/or signals generated by one or more sensors, electronic storage of a device accessible via a network, and/or other locations. The user information component 104 may obtain user information from one or more hardware components (e.g., an image capture device, a network device, a storage device) and/or one or more software components (e.g., software running on a computing device).

The user information may define one or more locations of a user at one or more times. A user may refer to a person using and/or operating the system 10. A user may refer to a person for whom the system 10 is being operated. A user may refer to a person of interest in identifying media items. Other types of users are contemplated. A location of a user at a time may refer to where the user was at a particular time. The user information may provide information on where the user was located at different times. For example, the user information may include value(s) of user location for different times.

In some implementations, the user information may define locations of a user at different times based on operation of one or more position sensors and/or other information. For example, a user may be carrying a GPS sensor/a device carrying a GPS sensor (e.g., image capture device, mobile device), and the user information may define GPS time and GPS location of the user. For instance, the user may carry an image capture device, and the GPS location and GPS time of the image capture device may be used as the GPS time and GPS location of the user. In some implementations, the location and time of the image capture device may be used as the location and time of the user even when the image capture device is not capturing media items. For example, a user may be carrying an image capture device that is not in media capture mode (e.g., not capturing images, not capturing videos). Even when the image capture device is not capturing media items, the location (e.g., determined using a position sensor, such as accelerometer, gyroscope, magnetometer, GPS sensor) and the time of the image capture device may be recorded and used to track locations of the user at different times. As another example, a user may be carrying a sensor that communicates with other devices (e.g., Bluetooth device, WiFi device), and locations of the users at different times may be determined based on when and which other devices communicated with the sensor carried by the user.

In some implementations, the user information may define locations of a user at different times based on user input and/or other information. User input may define/specify the locations of the user at different times. For example, a user may interact with an application to input particular locations for particular times.

The user information may define location(s) of a user at one or more times by including information that defines one or more content, qualities, attributes, features, and/or other aspects of the location(s) the user at one or more times. For example, the user information may define locations of a user at different times by including information that makes up/specifies the locations of the user at specific times and/or information that is used to determine the locations of the user at specific times. Other types of user information are contemplated.

The identification component 106 may be configured to identify one or more media items from the set of media items. Identifying a media item from the set of media items may include ascertaining, choosing, discovering, finding, selecting, and/or otherwise identifying the media item from the set of media items. The media item(s) may be identified for the user. The media item(s) may be identified for provision to the user. The media item(s) that are identified may include media item(s) that depicts the user/include depiction of the user. The media item(s) that are identified may include media item(s) that likely depicts the user/likely includes depiction of the user.

The media item(s) may be identified based on the capture information of the set of media items, the user information, and/or other information. The media item(s) may be identified based on the capture locations and capture times of the set of media items, and the location(s) of the user at one or more times, and/or other information. The media item(s) may be identified based on proximity of the capture locations and capture times of the set of media items with the location(s) of the user at different times. For example, the media item(s) may be identified based on similarity/overlap between the capture locations and capture times of the set of media items with the location(s) of the user at different times. The capture information of the set of media items and the user information may be used to identify media item that includes/likely includes the user (e.g., a video/image that was captured with the user in the scene).

For example, a media item captured by an image capture device may be identified based on proximity of capture of the media item in time and location to the user and/or other information. Proximity of capture of a media item in time and location to the user may refer the media item being captured with the user nearby. Proximity of capture of a media item in time and location to the user may refer the media item being captured by an image capture device that is close in space and time to the user. For example, proximity of capture of a media item in time and location to the user may include the media item being captured with the user within a threshold distance of the image capture device, with the user within the field of view of the image capture device, with the user within the field of view captured within the media item, with the user close enough to the image capture device that the user is depicted with at least a threshold size within the media item, and/or other proximity of the capture of the media item in time and location to the user.

A user may find a media item to be of particular interest when the user is depicted within the media item. The identification of the media items based on the proximity of capture of the media item in time and location to the user may enable automatic identification of media items that are of interest to the user.

Figure 3:
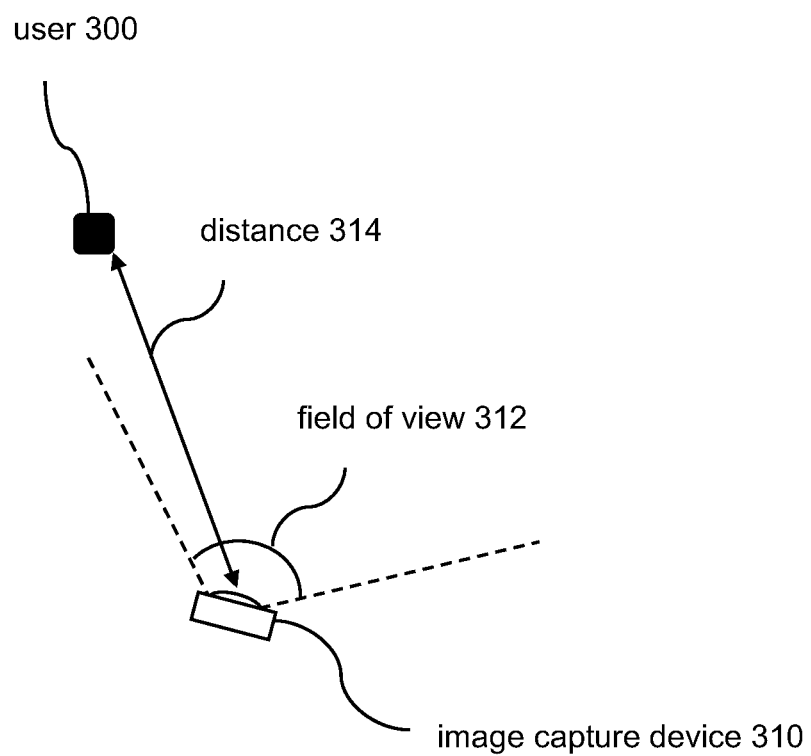
FIG. 3 illustrates example locations of a user and an image capture device.

For example, a media item being identified based on the proximity of the capture of the media item in time and location to the user may include the media item being identified based on a capture location of the media item at a capture time being within a threshold distance of a location of the user at the capture time. FIG. 3 illustrates example locations of a user 300 and an image capture device 310. A media item captured by the image capture device 310 from the position shown in FIG. 3 may be identified based on a distance 314 between the user 300 and the image capture device 310 being within a threshold distance.

The media item may be identified further based on determination that the user is within a field of view of the image capture device during capture of the media item. For example, referring to FIG. 3, the media item may be identified based on both (1) the distance 314 between the user 300 and the image capture device 310 being within a threshold distance, and (2) the user 300 being located within a field of view 312 of the image capture device 310.

In some implementations, a size of the field of view of an image capture device may be determined based on a size of punchout used by the image capture device to capture the media item and/or other information. A punchout may be used to extract one or more portions of the captured visual content for generation of/storage in a media item. Rather than using the entire field of view captured by the image capture device, a smaller portion may be used to generate/stored in the media item. For example, the image capture device may be capable of capturing a wide field of view video (e.g., video having around 130° diagonal field of view), but a smaller field of view may be captured within the video (e.g., video having around 90° diagonal field of view). The size of the punchout used by the image capture device to capture the media item may be used to determine the field of view used by the image capture device. For instance, metadata for the media item may specify the field of view used by the image capture device to capture the media item and/or the mode used to capture the media item, with the mode associated with a particular field of view. The field of view used by the image capture device may be determined from the metadata of the media item. The media item may be identified based on the user being within the field of view used by the image capture device.

In some implementations, the media item may be identified further based on a size of the user depicted within the media item. The size of the user depicted within the media item may refer to the extent of the field of view covered by the depiction of the user. The size of the user depicted within the media item may be defined using pixel numbers and/or angular size. For example, a media item may be identified when the depiction of the user in the media item is greater than a threshold size. In some implementations, the size of the user depicted within the media item may be determined based on visual analysis of the media item and/or other information. In some implementations, the size of the user depicted within the media item may be determined based on the field of view of the image capture device and the distance between the image capture device and the user when the media item was captured. The size of the user may be assumed (e.g., a specific height, a range of heights), and the size of the user depicted within the media item may be estimated based on the user size, the field of view of the image capture device, and the distance between the image capture device and the user when the media item was captured. In some implementations, the size of the user depicted within the media item may be further estimated based on location of the user depiction within the field of view. Different parts of the field of view may be distorted different within the media item (e.g., based on curvature of the optical element), and the distortion of the optical element for different parts of the field of view may be used to estimate the size of the user depicted within the media item.

In some implementations, the capture information and the user information may be used to identify media items captured by an image capture device that include/likely include depiction another image capture device. For example, the user information may include capture information of another image capture device. The identification component 106 may be configured to identify media items that include/likely include depiction another image capture device.

In some implementations, the field of view of the image capture device and a distance (e.g., threshold distance) may be used to determine a capture region. The capture region may include a region that is within the distance and within the field of view of the image capture device. For example, a media item being identified based on the proximity of the capture of the media item in time and location to the user may include the media item being identified based on the user being within the capture region during capture of the media item.

Figure 4A:
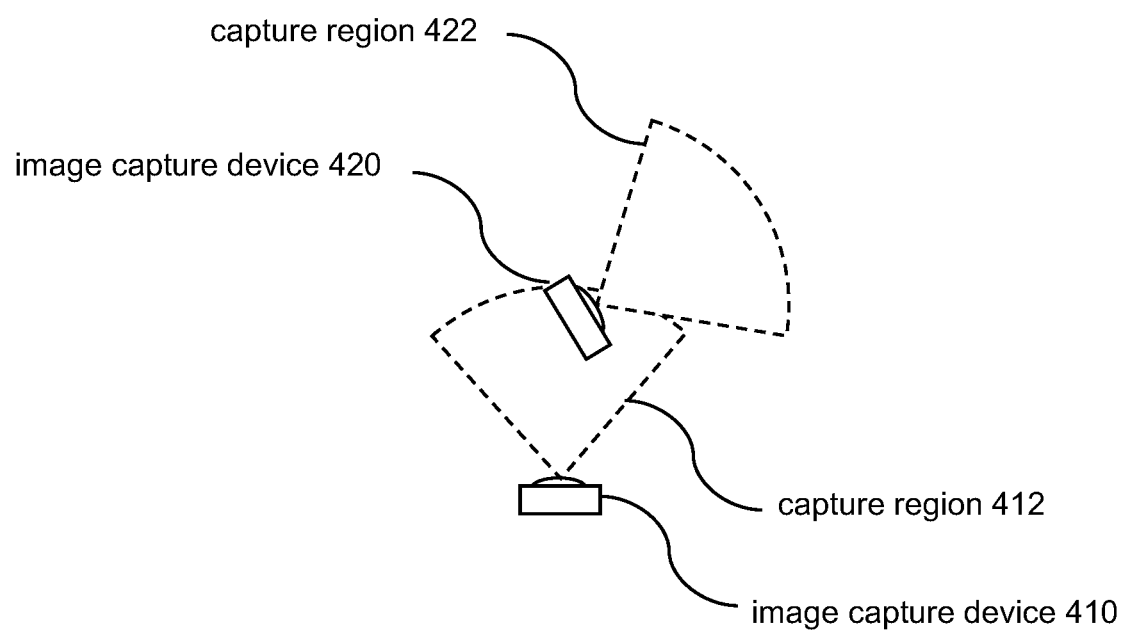
FIG. 4A illustrates example locations of image capture devices.
Figure 4B:
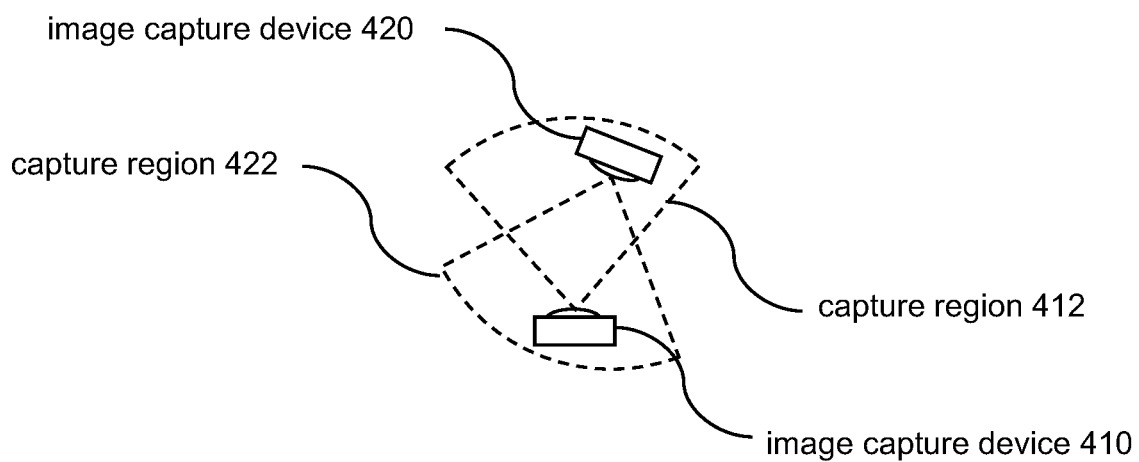
FIG. 4B illustrates example locations of image capture devices.

FIGS. 4A and 4B illustrate example locations of image capture devices 410, 420. The image capture device 410, 420 may be associated with (e.g., registered to, owned by, used by) different users. As shown in FIG. 4A, the image capture device 420 may be within a capture region 412 of the image capture device 410 when the image capture device 410 captured a media item. The media item captured by the image capture device 410 may be identified for the user of the image capture device 420. The image capture device 410 may not be within a capture region 422 of the image capture device 420 when the image capture device 420 captured a media item. The media item captured by the image capture device 420 may not be identified for the user of the image capture device 410.

In some implementations, a direction in which a field of view of an image capture device is pointed may be determined based on motion of the image capture device and/or other information. Motion of the image capture device may refer to translational and/or rotational movement of the image capture device. The motion of the image capture device may be determined based on information provided by one or more position sensors (e.g., accelerometer, gyroscope, magnetometer, GPS sensor) of the image capture device. For example, motion of the image capture device when it captured a media item may be determined based on speed and/or acceleration of the image capture device, and/or GPS location of the image capture device. The direction in which the field of view of the image capture device is pointed may be determined to be same as the direction in which the image capture device was moving (forward motion) when it captured the media item. For a video, the direction in which the field of view of the image capture device is pointed for different moments in the video may be determined to be same as the direction in which the image capture device was moving when it captured the different moments in the video.

Figure 5:
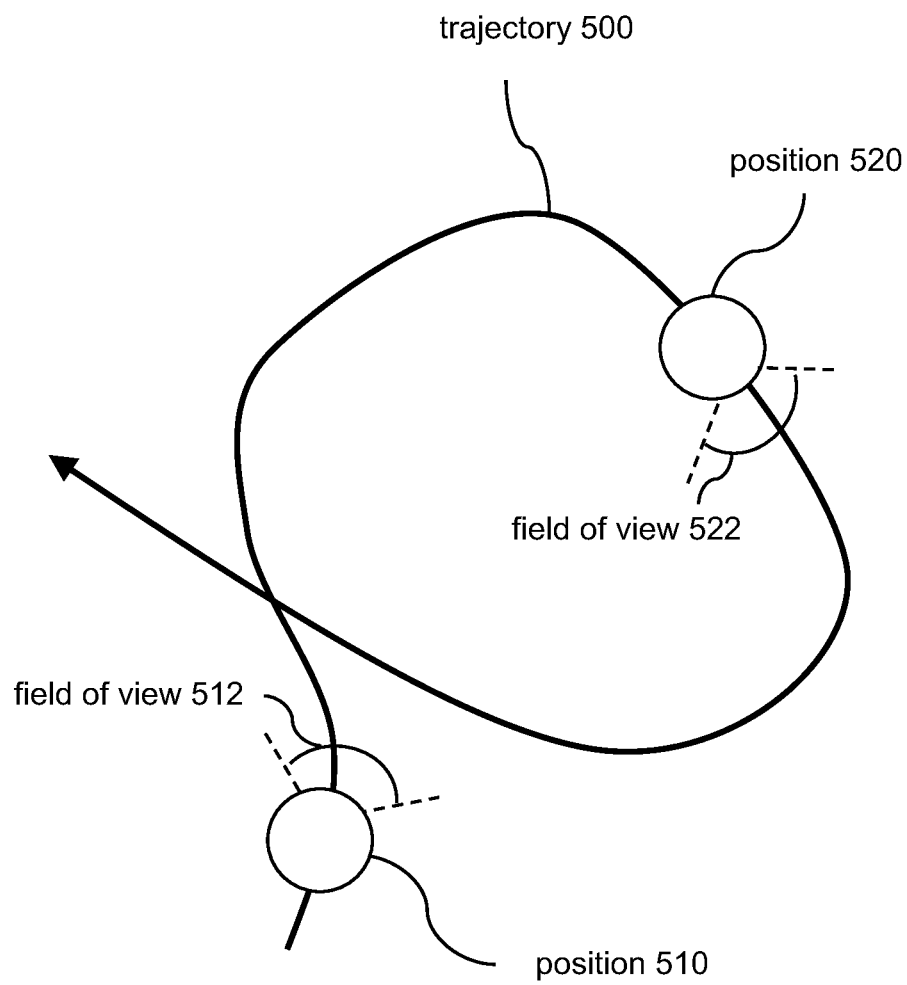
FIG. 5 illustrates example use of image capture device motion to determine direction of field of view.

FIG. 5 illustrates example use of image capture device motion to determine direction of field of view. Speed and/or acceleration of the image capture device, and/or GPS location of an image capture device may be used to determine a trajectory 500 taken by an image capture device over a duration of time. In FIG. 5, two different positions 510, 520 of the image capture device at different moments within the duration of time are shown. As shown in FIG. 5, the direction in which the field of view of the image capture device is pointed at different moments may be determined to be same as the direction in which the image capture device was moving at the different moments. For example, based on movement of the image capture device, a field of view 512 may be directed as shown at the position 510 and a field of view 522 may be directed as shown at position 520.

While FIGS. 3, 4A, 4B, and 5 depicts image capture devices, field of view, user, capture regions, and trajectory from a top-down view, this is merely for ease of reference as is not meant to be limiting. Analysis of information (e.g., capture information, user information) to identify media items may include analysis in two-dimensional space, three-dimensional space, and/or other space. For example, identification of media items using capture information and user information may consider not just the rotation of the image capture device about its yaw axis, but also the rotation of the image capture device about its pitch axis and/or roll axis. Identification of media items using capture information and user information may consider not just lateral and longitudinal location of the user, but also the elevation/height of the user. Other analysis of information to identify media items is contemplated.

In some implementations, the direction of the field of view determined based on the motion of the given image capture device may be confirmed using motion vector of the given media item and/or other information. Motion vector may provide information on how pixels in adjacent video frames/images have changed. Motion vector may provide information on how objects around the image capture device are moving with respect to the image capture device. Motion vector may be used to determine the orientation of the image capture device with respect to the direction of movement of the image capture device. For example, motion vector may be used to determine whether the image capture device is pointed in the direction of movement (e.g., pointed forward to capture scenes in the direction of movement) or pointed away from the direction of movement (e.g., rotated to the right to capture scenes to the right of the movement). The direction of the field of view of the image capture device may be confirmed to be same as the direction of movement of the image capture device based on motion vector indicating forward motion of the image capture device (e.g., based on motion vector pointed outwards toward the periphery of the images/video frames). The direction of the field of view of the image capture device may be determined to be different from the direction of movement of the image capture device based on motion vector indicating non-forward motion (e.g., lateral motion, vertical motion) of the image capture device (e.g., based on the motion vector pointed in the same direction).

In some implementations, the direction of the field of view determined based on the motion of the image capture device may be modified using motion vector of the media item and/or other information. Motion vector may be used to determine whether the image capture device is pointed in the direction of movement or pointed away from the direction of movement. Based on the motion vector indicating that the image capture device is pointed away from the direction of movement, the direction of the field of view may be changed according the direction and the amount by the image capture device is pointed away from the direction of movement. For example, based on the motion vector indicating that the image capture device is pointed 90 degrees to the right of the direction of movement, the direction of the field of view may be rotated to the right by 90 degrees.

Figure 6:
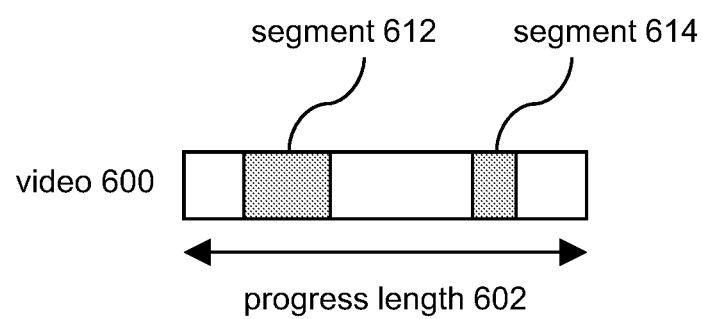
FIG. 6 illustrates example identification of segments of a video.

For a video, the capture information and the user information may be used to identify segment(s) of the video that includes/likely includes the user. In addition to identifying which videos includes/likely includes the user, the identification component 106 may identify moments (e.g., points in time, durations of time) in the video in which the video includes/likely includes the user. FIG. 6 illustrates example identification of segments of a video 600. The video 600 may have a progress length 602 (duration). A segment 612 and a segment 614 may be identified to include/likely include depiction of a user based on the capture information and the user information. Other segments of the video 600 may not be identified because the capture information and the user information may indicate that these segments do not include/likely do not include depiction of the user.

The provision component 108 may be configured to provide the identified media item(s) to the user. Providing an identified media item to the user may include presenting, sending, transmitting, making available, and/or otherwise providing the identified media item to the user. For example, the provision component 108 may provide an identified image/video to a user by uploading the identified image/video to the user (e.g., to a computing device associated with the user, to a storage account/device associated with the user) and/or by making the identified image/video available for download by the user. The identified media item(s) may be provided to the user with or without limits (e.g., limits on where or when the media item(s) may be accessed by the user, limits on number of downloads).

The user may view the media items, store the media items, use the media items to generate media item edits (e.g., a video edit), and/or otherwise use the media items. In some implementations, the media items provided to the user may include GPS time. GPS time of multiple media items may facilitate editing of the multiple media items as the multiple media items may be time-synchronized via use of GPS time. In some implementations, the media items may be combined for presentation. For example, the media items may be automatically concatenated and/or otherwise collated. For instance, the media items may be used to automatically generate synchronous and/or asynchronous media edit. The media items may be presented in a matrix and/or a grid of time-synced media items.

For a video, the provision component 108 may provide the entire of the video or one or more segments of the video. For example, for the video 600 shown in FIG. 6, the provisional component 108 may provide the entirety of the video 600 or the segments 612, 614 that have been identified as including/likely including the depiction of the user. The provision component 108 may provide information on the segments 612, 614 with the entirety of the video 600. For example, the provisional component 108 may provide the entirety of the video 600 with bookmarks/shortcuts for the segments 612, 614 for the user to easily see the 612, 614.

In some implementations, an identified media item may be provided to a user based on the user making their media items available for provision to another user. For example, a user may be provided with media items captured by other users if the user has granted permission to provide the user's media items to other users. In some implementations, the number of media items made available for provision to other users and/or the number of media items actually provided to other users may be used to determine whether an identified media item will be provided to a user.

In some implementations, permission to provide a media item to a user (e.g., a user different from the user that captured the media item) may be obtained before capture of the media item by an image capture device. Manually reviewing and marking (e.g., tagging) media items for sharing may be difficult and time consuming. Requiring users to manually mark individual media items that can be shared with others may make it less likely for the users to share their media items. Instead, users may be provided with an option to give permission to share media items before the media items are captured. For example, users may be invited to join an event when using their image capture devices. The event may be defined by location and/or time. When the users join the event, they may give permission to share (with other users) media items captured by their image capture devices during the event. Media items captured during the event may include media items captured by the image capture device while the image capture device was within the geographic boundary and temporal boundary of the event. The permission given for the event may be limited to a geographic area and limited to a duration of time. Information on the permission for sharing (e.g., sharing tags) may be stored with the media items (e.g., as part of metadata). For example, metadata for the media items may include event tags to identify the events that the user has joined, along with GPS time and GPS location of media item capture. The event tags, the GPS time, and the GPS location may be used to identify media items to be shared with other users of the events.

The sharing of the media items captured during the event may be limited to other users that have joined the event. Such pre-tagging of media items with permission to share before the media items are captured may make it easier for users to share their media items and make it more likely that users will share their media items. Such granting of permission to share media items may enable users who do not know each other to share their media items. In some implementations, other users' media items that depict a user may be provided to a user based on the user viewing and/or editing their own media item(s) from the event. For example, responsive to a user viewing/editing a video captured from an event, the user may be provided with an option to view/use media items captured by others and depicting the user. Such provision of other users' media items may facilitate collaborative content creation using proactive event tagging and location/time proximity.

In some implementations, permission to provide a media item to a user may be obtained via scanning of a machine-readable optical code by an image capture device that captured the media item. A machine-readable optical code may refer to a visual representation of data. The visual representation of data may be readable by a computing device based on capture of an image/video including the machine-readable optical code. A machine-readable optical code may encode the data visually by varying the size and shape of patterns within the machine-readable optical code. The data may be encoded within a machine-readable optical code using one or more encoding modes. A machine-readable optical code may include a one-dimensional machine-readable optical code (e.g., continuous or discrete barcodes), a two-dimensional machine-readable optical code (e.g., QR code), and/or a three-dimensional machine-readable optical code (e.g., holograms).

A user using an image capture device to scan the machine-readable optical code may result in the user giving permission to share their media items with others and/or the user being provided with an option to give permission to share their media items with others. For example, the machine-readable optical code may convey information for joining an event in which users will share their media items (captured during the event). The users may automatically join the event by scanning the machine-readable optical code with their image capture devices. The users may be prompted to join the event when they scan the machine-readable optical code with their image capture devices (e.g., display of the image capture device presents location and time information of the event, and prompts user to perform certain action, such as clicking a button, to join the event and share their media items for the event). In some implementations, the image capture device may provide information about the status of the event on a display. For example, the display of the image capture device may indicate that the user is participating in an event and/or that the media items being captured during the event will be shared with others. When the image captured device is powered on, the display of the image capture device may indicate that the user is participating in an event and/or that the media items being captured during the event will be shared with others. Thus, users are able to control how their media items are automatically shared based on events, locations, and times.

In some implementations, users may be provided with options to customized how their media items may be shared (e.g., limits on media item provision, limits on media item editing by others), licensing under which the media items may be shared (e.g., licensing terms and/or contact information), attribution information for the media items (e.g., names and/or links to be used for attribution), and/or other information relating to sharing of the media items. For example, users may input to the system 10 information on sharing limits, licensing, and/or attribution, and the information may be stored in the metadata of the media items.

In some implementations, some or all of the functions of the components 102, 104, 106, 108 of the system 10 may be performed by one or more servers. For example, media items, capture information, and user information may be stored in a server (e.g., uploaded to the server). In some implementations, media items, capture information, and/or user information may be uploaded to the server automatically. The server may utilize the capture information and the user information to automatically identify and/or share media items between different users. Rather than requiring users to manually identify and share their media items with other users, the server may utilize the capture information and the user information to search for media items that depict a particular user among collection of different users' media items, and provide the identified media items to the particular user.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
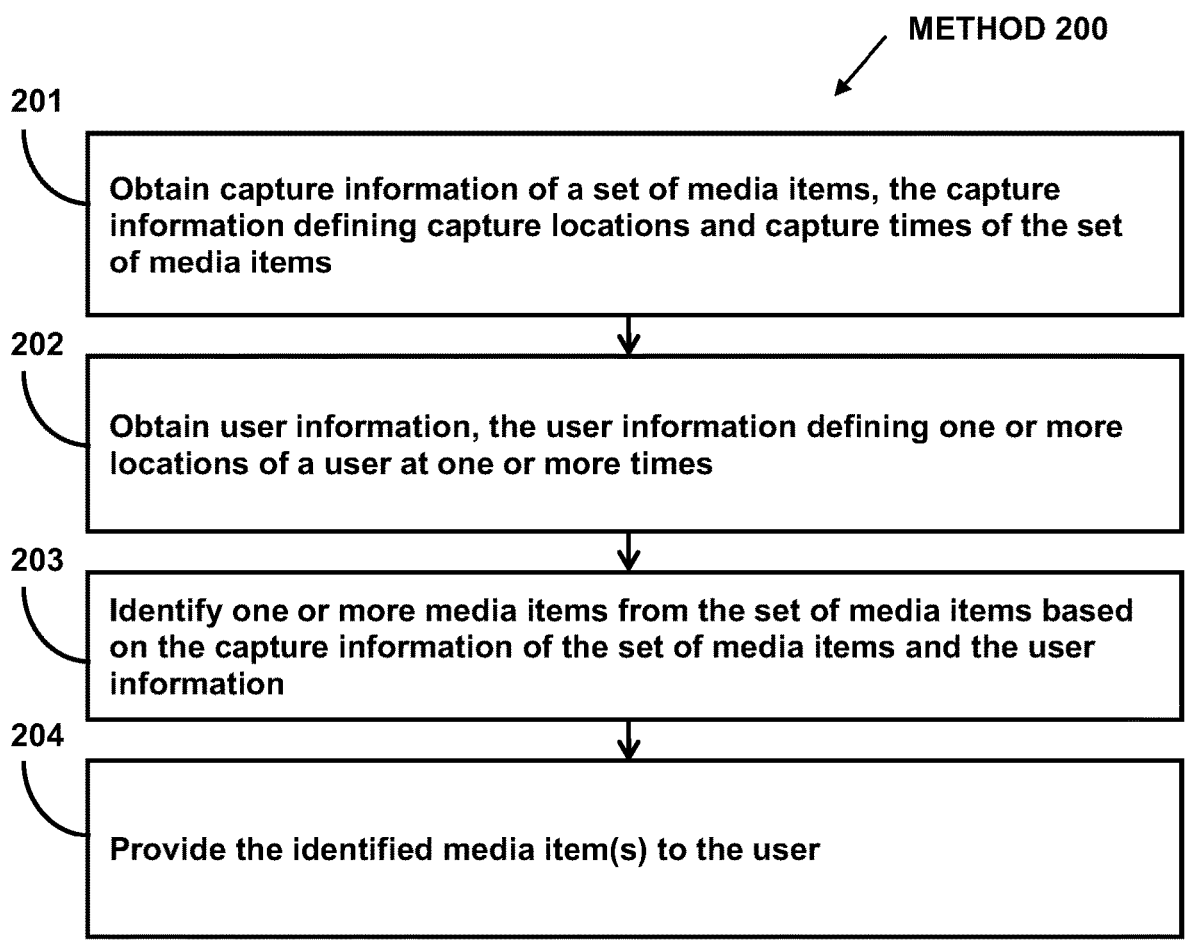
FIG. 2 illustrates an example method for identifying media items.

FIG. 2 illustrates method 200 for identifying media items. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, capture information of a set of media items may be obtained. The capture information may define capture locations and capture times of the set of media items. In some implementations, operation 201 may be performed by a processor component the same as or similar to the capture information component 102 (Shown in FIG. 1 and described herein).

At operation 202, user information may be obtained. The user information may define one or more locations of a user at one or more times. In some implementations, operation 202 may be performed by a processor component the same as or similar to the user information component 104 (Shown in FIG. 1 and described herein).

At operation 203, one or more media items may be identified from the set of media items based on the capture information of the set of media items and the user information. A given media item captured by a given image capture device may be identified based on proximity of capture of the given media item in time and location to the user. In some implementations, operation 203 may be performed by a processor component the same as or similar to the identification component 106 (Shown in FIG. 1 and described herein).

At operation 204, the identified media item(s) may be provided to the user. In some implementations, operation 204 may be performed by a processor component the same as or similar to the provision component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for identifying media items, the system comprising:
one or more hardware processors configured by machine-readable instructions to:
obtain capture information of a set of media items, the capture information defining capture locations and capture times of the set of media items,
obtain user information, the user information defining one or more locations of a user at one or more times;
identify one or more media items from the set of media items based on the capture information of the set of media items and the user information, wherein a given media item captured by a given image capture device is identified based on proximity of capture of the given media item in time and location to the user, wherein the given media item is identified based on determination that the user is within a field of view of the given image capture device during capture of the given media item and a size of the user depicted within the given media item; and
provide the one or more identified media items to the user.

2. The system of claim 1, wherein:
a direction in which the field of view of the given image capture device is pointed is determined based on motion of the given image capture device; and
permission to provide the given media item to the user is obtained before capture of the given media item.

3. A system for identifying media items, the system comprising:
one or more hardware processors configured by machine-readable instructions to:
obtain capture information of a set of media items, the capture information defining capture locations and capture times of the set of media items,
obtain user information, the user information defining one or more locations of a user at one or more times;
identify one or more media items from the set of media items based on the capture information of the set of media items and the user information, wherein a given media item captured by a given image capture device is identified based on proximity of capture of the given media item in time and location to the user, wherein the given media item is identified further based on determination that the user is within a field of view of the given image capture device during capture of the given media item; and
provide the one or more identified media items to the user.

4. The system of claim 3, wherein the given media item being identified based on the proximity of the capture of the given media item in time and location to the user includes the given media item being identified based on a first capture location of the given media item at a first capture time being within a threshold distance of a first location of the user at the first capture time.

5. The system of claim 4, wherein a size of the field of view of the given image capture device is determined based on a size of punchout used by the given image capture device to capture the given media item.

6. The system of claim 5, wherein a direction in which the field of view of the given image capture device is pointed is determined based on motion of the given image capture device.

7. The system of claim 6, wherein the direction determined based on the motion of the given image capture device is confirmed using motion vector of the given media item.

8. The system of claim 4, wherein the given media item is identified further based on a size of the user depicted within the given media item.

9. The system of claim 3, wherein permission to provide the given media item to the user is obtained before capture of the given media item.

10. The system of claim 3, wherein permission to provide the given media item to the user is obtained via scanning of a machine-readable optical code by the given image capture device that captured the given media item.

11. A method for identifying media items, the method performed by a computing system including one or more processors, the method comprising:

obtaining, by the computing system, capture information of a set of media items, the capture information defining capture locations and capture times of the set of media items, obtaining, by the computing system, user information, the user information defining one or more locations of a user at one or more times;

identifying, by the computing system, one or more media items from the set of media items based on the capture information of the set of media items and the user information, wherein a given media item captured by a given image capture device is identified based on proximity of capture of the given media item in time and location to the user, wherein the given media item is identified further based on determination that the user is within a field of view of the given image capture device during capture of the given media item; and providing, by the computing system, the one or more identified media items to the user.

12. The method of claim 11, wherein identifying the given media item based on the proximity of the capture of the given media item in time and location to the user includes identifying the given media item based on a first capture location of the given media item at a first capture time being within a threshold distance of a first location of the user at the first capture time.

13. The method of claim 12, wherein a size of the field of view of the given image capture device is determined based on a size of punchout used by the given image capture device to capture the given media item.

14. The method of claim 13, wherein a direction in which the field of view of the given image capture device is pointed is determined based on motion of the given image capture device.

15. The method of claim 14, wherein the direction determined based on the motion of the given image capture device is confirmed using motion vector of the given media item.

16. The method of claim 12, wherein the given media item is identified further based on a size of the user depicted within the given media item.

17. The method of claim 11, wherein permission to provide the given media item to the user is obtained before capture of the given media item.

18. The method of claim 11, wherein permission to provide the given media item to the user is obtained via scanning of a machine-readable optical code by the given image capture device that captured the given media item.

* * * * *